United States Patent
Hemmo et al.

(10) Patent No.: US 10,901,867 B2
(45) Date of Patent: Jan. 26, 2021

(54) DISTRIBUTED REDUNDANT STORAGE SYSTEM

(71) Applicant: Apple Inc., Cupertino, CA (US)

(72) Inventors: David Hemmo, Sunnyvale, CA (US); Vinay Ari, Sunnyvale, CA (US); Bernard L. Gallet, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 16/147,462

(22) Filed: Sep. 28, 2018

(65) Prior Publication Data

US 2019/0227892 A1 Jul. 25, 2019

Related U.S. Application Data

(60) Provisional application No. 62/621,237, filed on Jan. 24, 2018.

(51) Int. Cl.
*G06F 11/00* (2006.01)
*G06F 11/20* (2006.01)
*G06F 11/10* (2006.01)
*G06F 3/06* (2006.01)

(52) U.S. Cl.
CPC .......... *G06F 11/2094* (2013.01); *G06F 3/065* (2013.01); *G06F 3/067* (2013.01); *G06F 3/0619* (2013.01); *G06F 11/1044* (2013.01); *G06F 11/1076* (2013.01); *G06F 11/1092* (2013.01); *G06F 2201/82* (2013.01)

(58) Field of Classification Search
CPC .......... G06F 3/0646; G06F 2009/4557; G06F 3/0647; G06F 9/5083; G06F 3/067; G06F 3/065
See application file for complete search history.

(56) References Cited

U.S. PATENT DOCUMENTS

| | | | | |
|---|---|---|---|---|
| 5,490,248 A | * | 2/1996 | Dan .................... | G06F 11/1076 711/114 |
| 7,650,341 B1 | * | 1/2010 | Oratovsky .......... | G06F 11/1435 707/999.01 |
| 8,799,705 B2 | * | 8/2014 | Hallak ................ | G06F 11/1076 714/6.2 |
| 8,849,825 B1 | * | 9/2014 | McHugh ............. | G06F 16/1873 707/737 |
| 9,477,553 B1 | * | 10/2016 | Storer .................. | G06F 11/008 |

(Continued)

OTHER PUBLICATIONS

International Search Report and Written Opinion from PCT/US2019/012763, dated Apr. 5, 2019, 13 pages.

(Continued)

*Primary Examiner* — Jonathan D Gibson
(74) *Attorney, Agent, or Firm* — Morgan, Lewis & Bockius LLP

(57) ABSTRACT

A device implementing a system for object placement includes at least one processor configured to identify an object stored on two of a plurality of storage devices, and to determine a pairing value for each pair of the plurality of storage devices, the pairing value corresponding to a number of stored objects common to the pair. The at least one processor is further configured to select, based on the determined pairing values, two storage devices having a lowest pairing value relative to the determined pairing values, and to move the object to each of the two selected storage devices.

20 Claims, 7 Drawing Sheets

(56) References Cited

U.S. PATENT DOCUMENTS

| | | | | |
|---|---|---|---|---|
| 9,652,333 | B1* | 5/2017 | Bournival | G06F 3/0647 |
| 2005/0114728 | A1* | 5/2005 | Aizawa | G06F 11/008 |
| | | | | 714/6.32 |
| 2005/0138284 | A1* | 6/2005 | Cohn | G06F 3/0643 |
| | | | | 711/114 |
| 2010/0057844 | A1* | 3/2010 | Johnson | G06F 3/067 |
| | | | | 709/203 |
| 2011/0202723 | A1* | 8/2011 | Yochai | G06F 3/0631 |
| | | | | 711/114 |
| 2014/0281692 | A1* | 9/2014 | Paleologu | G06F 11/2089 |
| | | | | 714/6.32 |
| 2015/0277775 | A1* | 10/2015 | Manoharan | G06F 9/45558 |
| | | | | 711/114 |
| 2016/0085574 | A1* | 3/2016 | Dornemann | G06F 3/0605 |
| | | | | 718/1 |
| 2017/0031710 | A1* | 2/2017 | Kuik | G06F 3/064 |
| 2017/0109184 | A1* | 4/2017 | Ramani | G06F 11/3034 |

OTHER PUBLICATIONS

Second Written Opinion from PCT/US2019/012763, dated Jan. 27, 2020, 8 pages.

International Preliminary Report on Patentability from PCT/US2019/012763, dated Apr. 30, 2020, 10 pages.

* cited by examiner

|  | Storage Device 214a | Storage Device 214b | Storage Device 214c |
|---|---|---|---|
| Storage Device 214a | 3 | 1 | 2 |
| Storage Device 214b | 1 | 4 | 3 |
| Storage Device 214c | 2 | 3 | 5 |

*FIG. 4A*

|  | Storage Device 214a | Storage Device 214b | Storage Device 214c |
|---|---|---|---|
| Storage Device 214a | 4 | 2 | 2 |
| Storage Device 214b | 2 | 5 | 3 |
| Storage Device 214c | 2 | 3 | 5 |

*FIG. 4B*

|  | Storage Device 214a | Storage Device 214b | Storage Device 214c |
|---|---|---|---|
| Storage Device 214a | 5 | 3 | 2 |
| Storage Device 214b | 3 | 6 | 3 |
| Storage Device 214c | 2 | 3 | 5 |

*FIG. 4C*

|  | Storage Device 214a | Storage Device 214b | Storage Device 214c |
|---|---|---|---|
| Storage Device 214a | 6 | 3 | 3 |
| Storage Device 214b | 3 | 6 | 3 |
| Storage Device 214c | 3 | 3 | 6 |

*FIG. 4D*

|  | Storage Device 214a | Storage Device 214b | Storage Device 214c | Storage Device 214d |
|---|---|---|---|---|
| Storage Device 214a | 8 | 3 | 3 | 2 |
| Storage Device 214b | 3 | 7 | 2 | 2 |
| Storage Device 214c | 3 | 2 | 7 | 2 |
| Storage Device 214d | 2 | 2 | 2 | 6 |

*FIG. 6A*

|  | Storage Device 214a | Storage Device 214b | Storage Device 214c | Storage Device 214d |
|---|---|---|---|---|
| Storage Device 214a | 10 | 4 | 3 | 3 |
| Storage Device 214b | 4 | 9 | 2 | 2 |
| Storage Device 214c | 3 | 2 | 7 | 2 |
| Storage Device 214d | 3 | 3 | 2 | 8 |

*FIG. 6B*

DISTRIBUTED REDUNDANT STORAGE SYSTEM

CROSS-REFERENCE TO RELATED APPLICATIONS

The present application claims the benefit of U.S. Provisional Patent Application Ser. No. 62/621,237, entitled "DISTRIBUTED REDUNDANT STORAGE SYSTEM," filed Jan. 24, 2018, which is hereby incorporated herein by reference in its entirety and made part of the present U.S. Utility patent application for all purposes.

TECHNICAL FIELD

The present description relates generally to distributed redundant storage of data objects across multiple storage devices.

BACKGROUND

Multiple storage devices may be used to store data objects (e.g., files) and/or parity information. Upon the failure of a given storage device, to recover data objects stored on that storage device, related objects and/or parity information may be accessed from the other storage devices.

BRIEF DESCRIPTION OF THE DRAWINGS

Certain features of the subject technology are set forth in the appended claims. However, for purpose of explanation, several embodiments of the subject technology are set forth in the following figures.

FIGS. 4A-4D illustrate example matrices with pairing values for distributed redundant storage in accordance with one or more implementations.

FIGS. 6A-6B illustrate example matrices with pairing values for distributed redundant storage in accordance with one or more implementations.

DETAILED DESCRIPTION

Figure 1:
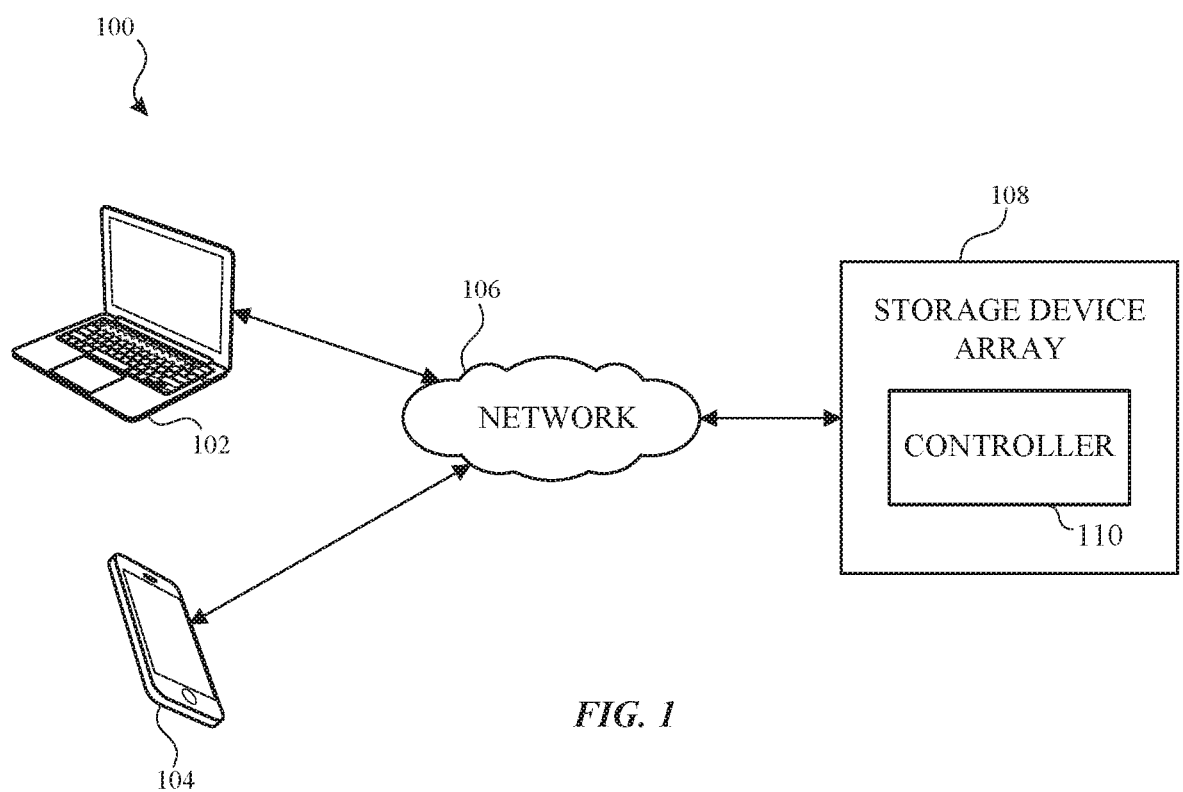
FIG. 1 illustrates an example network environment for distributed redundant storage in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides for moving objects (e.g., in replica) or clusters (e.g., with data containers and parity containers) stored across multiple storage devices. In the example of placing an object in replica, a the object is moved to two different storage devices. The subject system selects the two storage devices by determining a pairing value for each pair of storage devices. The pairing value corresponds to a number of stored objects that are common to a given pair of storage devices. The subject system selects the pair of storage devices with the lowest pairing value, and moves the object to those two storage devices.

In the example of placing a cluster across multiple storage devices, the cluster typically includes containers of data objects and one or more containers of parity data for the data objects. For example, there may be two data containers and one parity container stored across three different storage devices. The subject system selects these three storage devices by determining a pairing value for each pair of the of storage devices. The pairing value corresponds to a number of respective containers stored on the pair that belong to a respective common cluster. The subject system selects a first and second of the storage devices, which as a pair, have the lowest pairing value. The subject system then selects a third storage device, based on a summation of the pairing value for the first and third storage devices with the pairing value for the second and third storage devices. The first, second and third containers are moved to respective ones of the first, second and third storage devices.

By virtue of the foregoing distribution scheme, it is possible to increase the number of parallel reads across multiple storage devices, instead of sequentially reading from individual storage device(s), when recovering objects or clusters (e.g., in a case where a storage device fails). This may reduce the time for repair following failure of the storage device (e.g., thereby reducing the durability risk of the system), while at the same time balancing the amount of free space across the storage devices. Moreover, the subject system makes it possible to more evenly distribute the load of incoming writes to more storage devices, with increased throughput.

FIG. 1 illustrates an example network environment for distributed redundant storage in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104 (hereinafter 102-104), and a storage device array 108 including a controller 110. The network 106 may communicatively (directly or indirectly) couple, for example, any two or more of the electronic devices 102-104 and/or the storage device array 108. In one or more implementations, the network 106 may be an interconnected network of devices that may include, or may be communicatively coupled to, the Internet. For explanatory purposes, the network environment 100 is illustrated in FIG. 1 as including the electronic devices 102-104, and a single storage device array 108; however, the network environment 100 may include any number of electronic devices, and any number of storage device arrays.

The electronic devices 102 may provide data to be stored on the storage device array 108, and/or may request data to be retrieved from the storage device array 108. One or more of the electronic devices 102-104 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer, and the electronic device 104 is depicted as a smartphone. Each of electronic devices 102-104 may be, and/or may include all or part of, the electronic system discussed below with respect to FIG. 7.

The storage device array 108 includes a controller 110, and may further include multiple storage devices that store data as objects (e.g., files) and/or clusters (e.g., with object and parity data). Each of the multiple storage devices may correspond to one or more of a disk, an instance, a host, a rack or a data center. The controller 110 may implement logic for managing the placement of objects and/or clusters among the multiple storage devices of the storage device array 108. The storage device array 108, the multiple storage devices of the storage device array 108, and the controller 110 are discussed further below with respect to FIG. 2.

Upon the failure of one of the storage devices within the storage device array 108, the storage device array 108 may recover object(s) stored on the failed storage device, by accessing replica objects and/or the remaining containers of a cluster, from the other storage devices within the storage device array 108. Thus, even if a particular storage device within the storage device array 108 fails, it is possible for the storage device array 108 to recover the data upon detecting failure of the storage device.

Figure 2:
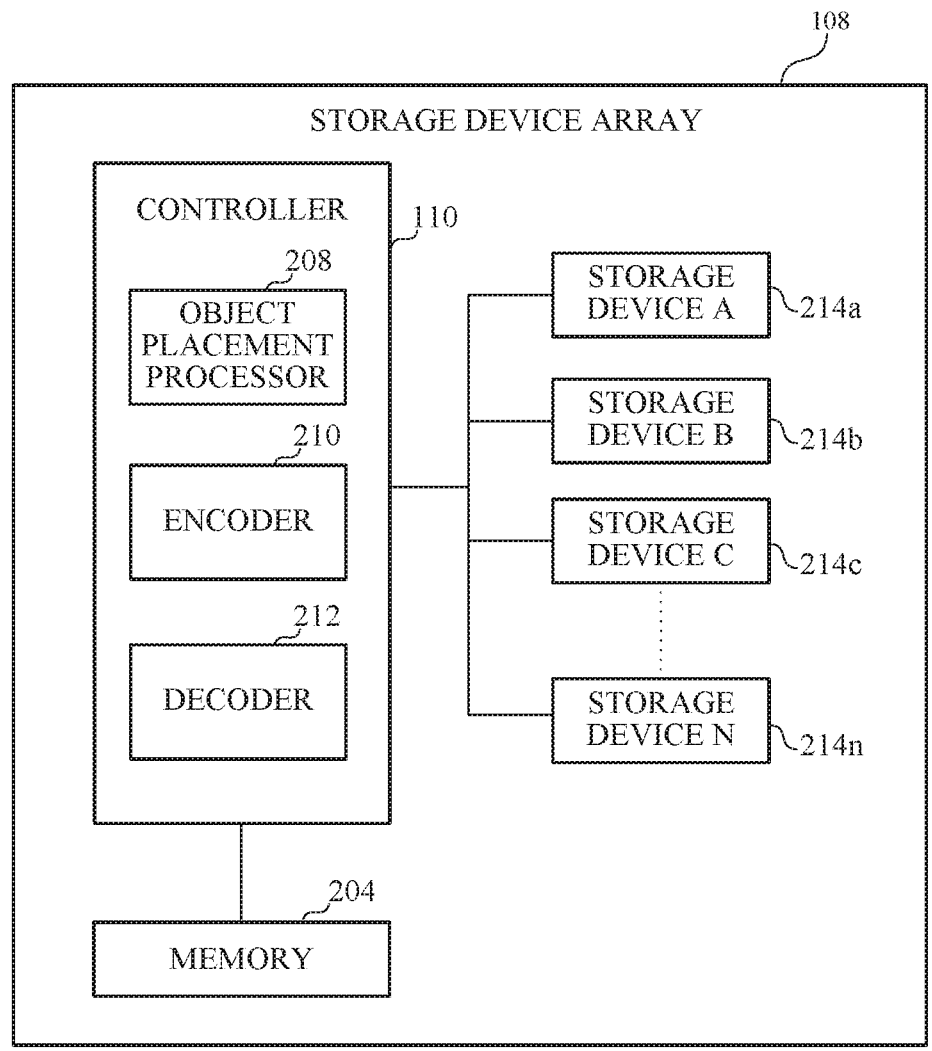
FIG. 2 illustrates an example storage device array that may implement distributed redundant storage in accordance with one or more implementations.

FIG. 2 illustrates an example storage device array that may implement distributed redundant storage in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The storage device array 108 may include the controller 110, a memory 204, and storage devices 214a-n. The controller 110 may include suitable logic, circuitry, and/or code that enable processing data and/or controlling operations of the storage device array 108. In this regard, the controller 110 may be enabled to provide control signals to various other components of the storage device array 108. The controller 110 may also control transfers of data between various portions of the storage device array 108. Additionally, the controller 110 may enable implementation of an operating system or otherwise execute code to manage operations of the storage device array 108.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The storage device array 108 may include one or more communication interface(s) with suitable logic, circuitry, and/or code that enable wired or wireless communication, such as between any of the electronic devices 102-104 over the network 106. In one or more implementations, each of the storage devices 214a-n may include its own communication interface. The communication interface(s) may include, for example, one or more of Fiber communication interface, an Ethernet communication interface a USB communication interface, or generally any communication interface.

The controller 110 includes one or more decoders 212, such as error-correcting code (ECC) decoders, and one or more encoders 210, such as ECC encoders. The one or more decoders 212 and the one or more encoders 210 may be one or more dedicated circuits of the controller 110, may be implemented via firmware running on the controller 110, and/or may be one or more circuits separate from the controller 110.

The controller 110 is operable to read data from, and write data to, the storage devices 214a-n. The controller is further operable to identify, or to receive, an object or a cluster, for storage on the storage devices 214a-n. In the case of an object (e.g., a data file), the object may be for storing in replica across two or more of the storage devices 214a-n. In a case the object is a cluster, the cluster may correspond to a set of data container(s) (with multiple objects) and parity container(s) (with parity data for the objects) for storing across two or more of the storage devices 214a-n.

As noted above, each of the storage devices 214a-n may correspond to one or more of a disk, an instance, a host, a rack or a data center. In one or more implementations, the storage devices 214a-n may each include one or more physical blocks, such as NAND blocks and/or NOR blocks. The physical blocks may each include one or more physical pages. The controller 110 may utilize the memory 204 (e.g., RAM) to assist with reading/writing data to/from the storage devices 214a-n. For example, the memory 204 may be used as a buffer for rate control, or may otherwise be used to store information (e.g., error counts, block error maps, variables, physical block status, logical to physical address mapping tables, endurance/retention data, settings, etc.) utilized by the controller 110 to read/write data to/from the storage devices 214a-n, as well as recover data from the storage devices 214a-n.

The controller 110 may implement one or more algorithms or techniques in conjunction with reading and/or writing data to the storage devices 214a-n, such as security techniques (e.g. encryption), error correction coding techniques (e.g. low-density parity-check (LDPC)), compression techniques, redundancy techniques (e.g. redundant array of independent disks (RAID) techniques), etc.

The controller 110 further includes an object placement processor 208, which implements one or more algorithms or techniques for placing objects (e.g., in replica) or clusters (e.g., with data containers and parity containers) across the storage devices 214a-n. In this manner, the data is spread out across multiple of the storage devices 214a-n and may therefore be recoverable if one or more of the storage devices 214a-n fails. In placing an object, the object placement processor 208 may implement one or more algorithms or techniques as described below with respect to FIGS. 3 and 4A-4D. In placing a cluster, the object placement processor may implement one or more algorithms or techniques as described below with respect to FIGS. 5 and 6A-6B.

The distribution of the objects by the object placement processor 208 makes it possible to more evenly distribute the load of incoming writes (e.g., from one or more of electronic devices 102-104) to more storage devices, with increased throughput. Moreover, the object placement processor 208 may assist in reducing network congestion and/or processing time in the scenario in which users (e.g., of electronic devices 102-04) fetch data immediately or otherwise shortly after a put operation, or fetch data within a certain time range after a put operations. The timing of such fetch requests, particularly when dealing with a large number of users, may congest the network 106, particularly if the data objects are not properly balanced amongst the storage devices 214a-n.

Moreover, the object placement processor 208 makes it possible to reduce repair time, thereby reducing the durability risk of the system. In this regard, the durability of storage systems may typically be calculated based on an upper limit of the repair time. As such, it is critical that repair time have a reduced upper limit, and generally have a lower time for repair. In cases where a storage service implements erasure encoding, it is preferable to reduce the number of parity reads for recovery. For example, a parity read should be read from multiple storage devices (e.g., disks) in parallel, instead of sequentially from one storage device (e.g., disk). Moreover, reduced repair time may facilitate other optimizations during repair. For example, if only one parity fails for a given time period, one optimization may be to wait for additional parity failures, since repairs may be faster if multiple parities fail and can be read in parallel.

Conventional storage systems may balance free space, by selecting the host (e.g., storage device) with lowest free space and placing object(s) or container(s) on the host. The following scenario may be considered in which two replicas of each data object are stored:

Placement Example 1

Storage Device A: 1, 2, 3, 4, 5
Storage Device B: 1, 2, 3, 4, 5
Storage Device C: 6, 7, 8, 9, 10
Storage Device D: 6, 7, 8, 9, 10

In the above example, an assumption can be made that storage devices A, B, C and D have equal storage space, and that objects 1, 2, 3, 4, 5, 6, 7, 8, 9, 10 are of equal size. In this example, each of storage devices A-D has five replicas of different objects. In conventional systems, such distribution of objects is a valid solution, since all of the storage devices have equal free space.

However, problems arise if one of the storage devices (e.g., storage device B) fails. For maintaining the durability guarantee, there should be two replicas of each object. Hence, the replicas of objects 1, 2, 3, 4, 5 that were previously stored on storage device B, should be retrieved from another storage device. As all these replicas of storage device B are placed on storage device A, these replicas would be retrieved from storage device A. If it takes one unit of time to read a replica from storage device A, it will take five units of time to retrieve all of the objects that were previously stored on storage device B. In particular, it may not be possible to read the objects 1-5 in parallel from storage device A. For example, if storage device A is a host, storage device A may not have stored everything on a single disk. Moreover, parallel read operations may adversely affect system performance and lose capabilities such as sequential reads.

Thus, the subject system (e.g., the object placement processor 208) provides for distributing objects in a manner which increases the number of parallel reads. For example, given the same hosts and objects in above placement example 1, the object placement processor 208 may place replicas across storage devices A-D as follows:

Placement Example 2

Storage Device A: 1, 3, 5, 7, 9
Storage Device B: 1, 4, 6, 7, 10
Storage Device C: 2, 3, 6, 8, 9
Storage Device D: 2, 4, 5, 8, 10

In this example, if storage device B were to fail, then replicas of the objects stored on storage device B may be retrieved as follows: replicas 1 and 7 from storage device A, replicas 4 and 10 from storage device D, and replica 6 from storage device C. As such, reads from different storage devices can be made in parallel (e.g., with little or no overhead). In this example, at most two replicas are read from any one storage node, and the time taken to repair all the replicas lost due to the failure of storage device B is 2 units of time. This is an improvement over placement example 1 above, which takes 5 units of time. Moreover, if scaled to a larger number of storage devices with large amounts of free space, this time difference becomes even more significant.

In one or more implementations, one or more of the object placement processor 208, the encoder 210, and the decoder 212 are implemented as software instructions, stored in the memory 204, which when executed by the controller 110, cause the controller 110 to perform particular function(s). In one or more implementations, one or more of the object placement processor 208, the encoder 210 and the decoder 212 may be implemented in software (e.g., subroutines and code) and/or hardware (e.g., an Application Specific Integrated Circuit (ASIC), a Field Programmable Gate Array (FPGA), a Programmable Logic Device (PLD), a state machine, gated logic, discrete hardware components, or any other suitable devices) and/or a combination of both.

In one or more implementations, some or all of the depicted components of the storage device array 108 may share hardware and/or circuitry, and/or one or more of the depicted components may utilize dedicated hardware and/or circuitry. Additional features and functions of these modules according to various aspects of the subject technology are further described in the present disclosure.

Figure 3:
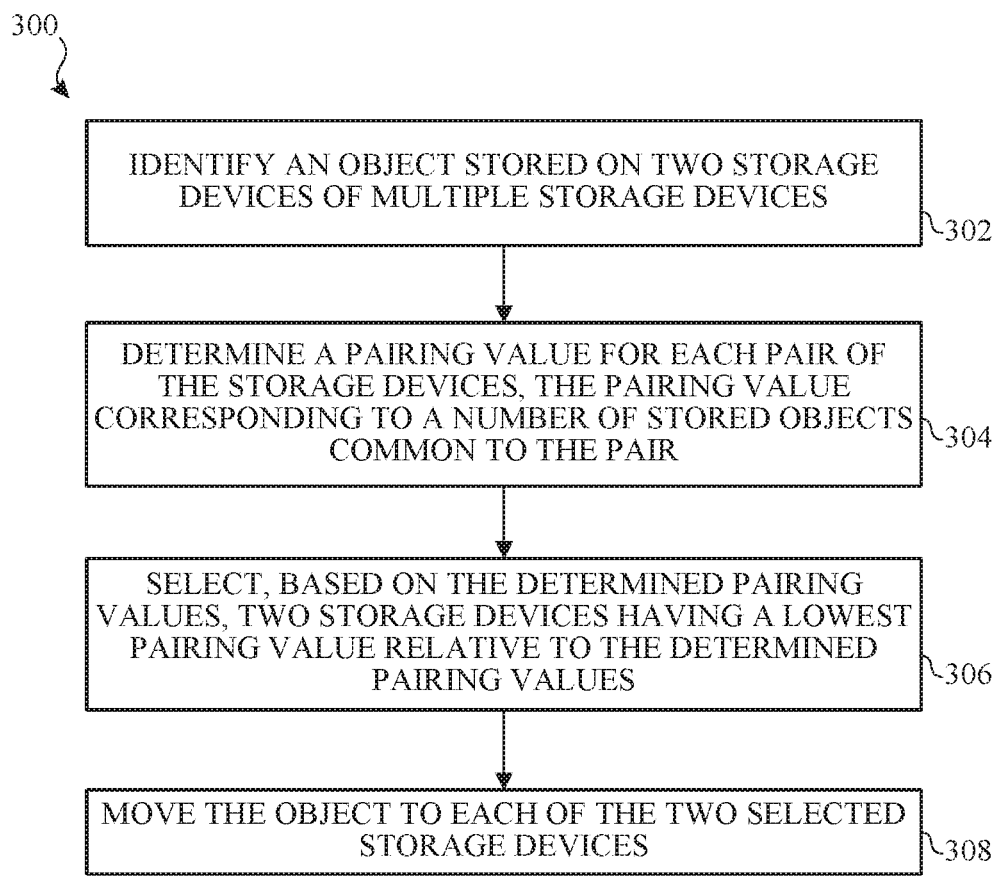
FIG. 3 illustrates a flow diagram of an example process for distributed redundant storage in accordance with one or more implementations.

FIG. 3 illustrates a flow diagram of an example process for distributed redundant storage in accordance with one or more implementations. For explanatory purposes, the process 300 is primarily described herein with reference to the storage device array 108, the controller 110 and the object placement processor 208 of FIGS. 1-2. However, the process 300 is not limited to the storage device array 108, the controller 110 and/or the object placement processor 208, and one or more blocks (or operations) of the process 300 may be performed by one or more other components of the storage device array 108 and/or by other suitable devices. Further for explanatory purposes, the process 300 is described with reference to FIGS. 4A-4D, which illustrate examples of matrices with pairing values for distributed redundant storage in accordance with one or more implementations. The process 300 is not limited to the matrices and pairing illustrated in the examples of FIGS. 4A-4D. Moreover, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

In the example described with respect to FIGS. 3 and 4A-4D, the object placement processor 208 may assume that all the replicas of a given object are the same size. In addition, the object placement processor 208 may assume that only one replica is placed per storage device. Referring to FIG. 3, the object placement processor 208 identifies an object for previously stored on two storage devices from among multiple storage devices (302). Each of the storage devices may correspond to at least one of a disk, an instance, a host, a rack or a data center.

The object placement processor 208 determines a pairing value for each pair of the multiple storage devices (304). The pairing value corresponds to a number of stored objects common to the pair. For example, if the storage device A has replicas belonging to objects 1, 2, 5, 7, 10, and the storage device B has replicas belonging to objects 2, 5, 7, 9, 11, then the stored objects common to the storage device A and the storage devices B is 2, 5 and 7. Hence, the pairing value between the storage device A and the storage devices B is 3.

Thus, for a given set to storage devices (e.g., in a blob store), the object placement processor 208 calculates a matrix of pairing values for all of the storage devices (e.g., in the blob store). FIG. 4A illustrates an example of pairing values between the storage devices 214a, 214b and 214c. As seen in FIG. 4A, the storage device 214a has a pairing value of 1 with storage device 214b, and has a pairing value of 2 with storage device 214c.

As noted above, a new object is identified for placement in replica across the storage devices 214a-c. In one or more implementations, to identify the object, the object placement processor 208 may select a pair of storage devices having a highest pairing value relative to the determined pairing values, and then select the object as one of the stored objects common to the pair. Thus, the "new" object may correspond to an object already stored in replica on the storage devices 214a-c, but that should be moved to optimize repair time in the event a storage device fails. The process of identifying new objects to move from one storage device to another may run as a background process, such as a separate thread on the storage device array 108. In one or more implementations, the object placement processor 208 may schedule, pause or otherwise manage timing of this background process based on the times when an amount of user traffic on the network 106 is below a current threshold value (e.g., based on current network usage), or below a predicted threshold value (e.g., based on when network usage is predicted to be lower from usage history).

Alternatively, or in addition, the new object for placement in replica across the storage devices A-C may be based on a new data object being received by the storage device array 108 from one or more of the electronic devices 102-104. Thus, in addition to a background process which relocates a previously-stored object for optimized recovery, the storage device array 108 may place objects received from the electronic devices 102-104 in accordance with FIGS. 3 and 4A-4D.

When placing an object, the object placement processor 208 selects, based on the matrix of determined pairing values, two storage devices having a lowest pairing value relative to all of the determined pairing values (306). In the case of FIG. 4A, storage device 214a has the lowest pairing value of 1 with storage device 214b. Hence, the object placement processor 208 facilitates moving (e.g., in conjunction with controller 110) the object to each of the two storage devices 214a and 214b (308). In one or more implementations, the object placement processor 208 may pre-calculate the possible placement of a new object before an actual call for placement, such that computation and memory is reduced.

The object placement processor 208 may increment the pairing value for the two storage devices within the matrix that stores the pairing values. For example, relative to FIG. 4A, FIG. 4B illustrates that the pairing value between storage device 214a and storage device 214b is incremented from 1 to 2. Moreover, the pairing value between storage device 214a and itself (e.g., diagonal value) is incremented from 3 to 4, and the pairing value between storage device 214b and itself is incremented from 4 to 5, to represent the new object stored on each of these devices.

With respect to FIG. 4B, if a second new object is identified for placement across the storage devices 214a-c, the lowest pairing value is between the storage device pair of 214a and 214b, and the storage device pair of 214a and 214c, since each pair has a pairing value of 2. In one or more implementations, the object placement processor 208 may randomly select one of the two pairs, and/or the object placement processor 208 may select the pair having the lowest total number of objects stored. In this example, the object placement processor 208 selects the storage device pair of 214a and 214b. Thus, as shown in FIG. 4C, the pairing value between storage device 214a and storage device 214b is incremented from 2 to 3. In addition, the pairing value between storage device 214a and itself is incremented from 4 to 5, and the pairing value between storage device 214b and itself is incremented from 5 to 6.

FIG. 4D illustrates an example of a storing a third new object. In this example, the lowest pairing value of 2 is between the storage device pair 214a and 214c. Thus, the pairing value between storage device 214a and storage device 214c is incremented from 2 to 3, the pairing value between storage device 214a and itself is incremented from 5 to 6, and the pairing value between storage device 214c and itself is increment from 5 to 6.

As noted above, in the event that a failure is detected on any of the storage devices 214a-c, the object placement processor 208 may retrieve the replica for the object from the failed storage device, from one of the other two storage devices. The object placement processor 208 may store the retrieved copy of the object on another storage device.

Thus, the process 300 illustrates an example in which replicas of objects are placed in a distributed manner cross multiple storage devices. By selecting storage devices based on lowest pairing values, it is possible to increase the number of parallel reads across multiple storage devices, instead of sequentially reading from individual storage device(s), when recovering objects (e.g., in a case where a storage device fails). This may reduce the time for repair following failure of the storage device (e.g., thereby reducing the durability risk of the system), while at the same time balancing the amount of free space across the storage devices. Moreover, it is possible to more evenly distribute the load of incoming writes to more storage devices, with increased throughput.

Figure 5:
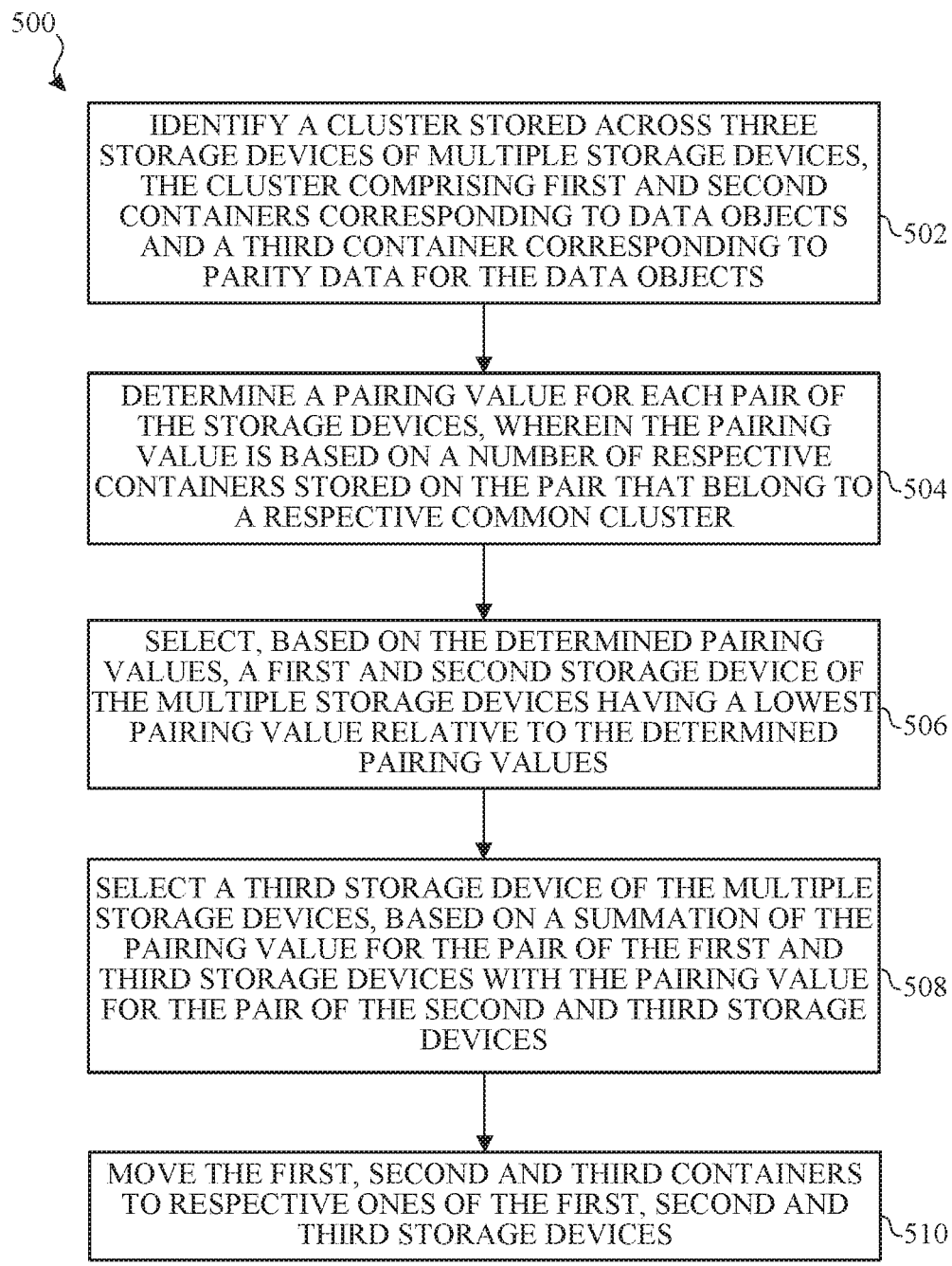
FIG. 5 illustrates a flow diagram of another example process for distributed redundant storage in accordance with one or more implementations.

FIG. 5 illustrates a flow diagram of another example process for distributed redundant storage in accordance with one or more implementations. For explanatory purposes, the process 500 is primarily described herein with reference to the storage device array 108 of FIGS. 1-2, and the corresponding controller 110 and object placement processor 208 of FIG. 3. However, the process 500 is not limited to the storage device array 108, the controller 110 and/or the object placement processor 208, and one or more blocks (or operations) of the process 500 may be performed by one or more other components of the storage device array 108 and/or by other suitable devices. Further for explanatory purposes, the process 500 is described with reference to FIGS. 6A-6B, which illustrate examples of matrices with pairing values for distributed redundant storage in accordance with one or more implementations. The process 500 is not limited to the matrices and pairing illustrated in the examples of FIGS. 6A-6B. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As noted above, the process 300 of FIG. 3 relates to placement of replicas across multiple storage devices. On the other hand, the process 500 relates to placement of clusters across multiple storage devices, where each storage device may correspond to at least one of a disk, an instance, a host, a rack or a data center. In one or more implementations, a cluster corresponds to a set of containers (e.g., based on erasure encoding procedure). The set of containers in a cluster includes data containers which store one or more objects, and parity containers which store parity data with erasure encoding procedure for recovery of those one or more objects.

The process 500 illustrates an example in which (2, 1) erasure encoding is used, e.g., where there are 2 data containers and 1 parity containers for each cluster. Hence, the cluster has total of 3 containers. If one of the storage devices 214a-214d fails, thereby making one container unavailable from that storage device, the storage device array 108 would be required to fetch the two other containers from the other storage devices for recovery. Thus, referring to FIG. 5, the object placement processor 208 identifies a new cluster stored across three storage devices of multiple storage devices 214a-d (502). The cluster includes first and second containers corresponding to data objects and a third container corresponding to parity data for the data objects.

The object placement processor 208 may calculate pairing values for all of the storage devices 214a-d with respect to clustering (504). In one or more implementations, the pairing values may be determined prior to identifying the new cluster (502). With respect to a pair of two storage devices, the pairing value corresponds to a number of respective containers stored on the pair that belong to a respective common cluster. In the example of FIG. 6A, storage device 214a and storage device 214b have a pairing value of 3, which indicates that each of the storage devices 214a and 214b have three containers that belong to three respective common clusters.

In one or more implementations, to identify the cluster (502), the object placement processor 208 may select storage devices having a highest pairing value relative to the determined pairing values, and then select the respective cluster for moving. Thus, the "new" cluster may correspond to the containers of a cluster already stored on the storage devices 214a-d, but that should be moved to optimize repair time in the event a storage device fails. The process of identifying new clusters to move between storage devices may run as a background process, such as a separate thread on the storage device array 108. In one or more implementations, the object placement processor 208 may schedule, pause or otherwise manage timing of this background process based on times when an amount of user traffic on the network 106 is below a current threshold value (e.g., based on current network usage), or below a predicted threshold value (e.g., based on when network usage is predicted to be lower from usage history).

Alternatively, or in addition, the new cluster for placement across the storage devices 214a-d may be based on new data received by storage device array 108 from one of electronic devices 102-104. Thus, in addition to a background process which relocates containers of a previously-stored cluster for optimized recovery, the storage device array 108 may also place new clusters received from the electronic devices 102-104 in accordance with the example of FIGS. 6 and 6A-6B.

The object placement processor 208 selects, based on the determined pairing values, a first and second storage device of storage devices having a lowest pairing value relative to the determined pairing values (506). The pair of the first and second storage devices may further be selected based on storing a lowest number of containers relative to each other pair of the multiple storage devices.

Thus, in the example of FIG. 6A, the object placement processor 208 may determine that each of the storage device pair (214a, 214d), (214b, c), (214c, 214d) and (214d, 214a) have a pairing value of three. As such, in one or more implementations, the object placement processor 208 may perform a secondary check and select the storage device pair which has the lowest number of the containers, based on the diagonal entries of in the matrix of FIG. 6A. Thus, even though the storage device pairs (214a, 214d), (214b, 214c), (214c, 214d) and (214d, 214a) have the same lowest pair value of three, the object placement processor 208 may select the storage device pair of (214d, 214a), since this storage device pair has the lowest number of containers. The object placement processor 208 may therefore determine that the first and second (of the three containers) in the cluster be respectively stored on storage device 214d (the "first storage device") and storage device 214a (the "second storage device").

With respect to the remaining third container of the cluster, the object placement processor 208 may select a third storage device of the multiple storage devices (508). The selection may be based on a summation (e.g., the lowest summation) of the pairing value for the pair of the first storage device (e.g., storage device 214d) and the third storage device (one of storage devices 214b or 214c) with the pairing value for the pair of the second storage device (e.g., storage device 214a) and the third storage device (one of storage devices 214b or 214c). For example, the summations may be calculated as follows:

Summation for storage device 214b=storage device pairings (214b,214a)+storage device pairings (214b,214d)=3+2=5

Summation for storage device 214c=storage device pairings (214c,214a)+storage device pairings (214c,214d)=3+2=5

In the above example, both of storage devices 214b and 214c have the same storage device pairings summation. As an additional check, the server may select the storage device of 214b and 214c which has the lowest total number of containers (e.g., from the diagonal in the matrix of FIG. 6A). In this case, the total of containers on storage devices 214b and 214c is still the same (e.g., 6 containers). At this stage, the object placement processor 208 may randomly select storage device 214b over storage device 214c for the third container.

Thus, the object placement processor 208 at process step 510 moves (e.g., in conjunction with the controller 110) the first, second and third containers to respective ones of the first (storage device 214d), second (storage device 214a) and third (storage device 214b) storage devices. In one or more implementations, the object placement processor 208 may pre-calculate the possible placement of a new cluster before an actual call for actual placement, such that computation and memory is reduced.

The object placement processor 208 may increment the pairing value for the first, second and third devices within a data structure that stores the pairing values (e.g., as a matrix stored in the memory 204). The pairing value for each of the first, second and third devices may be incremented by one, based on a size of the first, second and third containers being equal. Thus, as shown in the example of FIG. 6B, the pairing value between storage device 214a and 214b is incremented from 3 to 4, the pairing value between storage devices 214a and 214d is incremented from 2 to 3, and the pairing value between storage devices 214b and 214d is incremented from 2 to 3. Moreover, the pairing value between storage devices 214a and itself is incremented from 8 to 10, the pairing value between storage devices 214b and itself is incremented from 7 to 9, and the pairing value between storage devices 214d and itself is incremented from 6 to 8.

In one or more implementations, the sizes of the first, second and third containers may not be equal. For example, even if the objects stored within containers may be assumed to have the same size, the containers may hold a different number of objects. One problem with having containers of different sizes is, even if placement of the containers is balanced as described above, available space may not be balanced. Thus, the object placement processor 208 may increment the pairing value for each of the first, second and third devices based on a lowest size among the first, second and third containers, rather than simply incrementing by a fixed amount.

In other words, instead of incrementing the count by one for the respective storage device when a container is placed, the object placement processor 208 may increment the count by the size of the lowest-sized container within the cluster. By incrementing the count in this manner, if a large container is placed, the pairing value for the appropriate pair(s) of storage devices increases. As such, if a new container is to be placed, those storage devices would not be selected for placement until the pairing values for the other storage devices catch up.

For example, a cluster with containers of sizes 10, 20, 30 bytes may be placed on nodes 1, 2, 3 as shown below:

| Node | 1 | 2 | 3 |
|------|----|----|----|
| 1 | 10 | 10 | 10 |
| 2 | 10 | 20 | 20 |
| 3 | 10 | 20 | 30 |

If node 1 goes down based on the erasure encoding, it is only necessary to read the first 10 bytes from containers on nodes 2 and 3 as the container size is 10 bytes. Hence, the pairing of node 1 with 2 and 3 is 10.

Similarly, if node 2 goes down, given the container size of 10 on node 1, only 10 bytes can at most can be read from node 1. Hence, pairing between node 2 and node 1 is still 10. In addition, given the size of container on node 2 is 20, it is only necessary to read the first 20 bytes from the container on node 3, and as such, the pairing is 20.

In one or more implementations, the storage device array 108 may further detect failure of one of the first, second or third storage devices, the failed storage device storing one of the first, second or third containers. In response to the detection, the storage device array 108 may retrieve the other two of the first, second or third containers from the respective first, second or third storage devices, and recover the data stored in the container on the failed storage device. The storage device array 108 may then store the recovered container on another storage device.

Thus, the process 500 illustrates an example in which clusters are placed in a distributed manner cross multiple storage devices. By selecting storage devices based on lowest pairing values, it is possible to increase the number of parallel reads across multiple storage devices, instead of sequentially reading from individual storage device(s), when recovering containers (e.g., in a case where a storage device fails). This may reduce the time for repair following failure of the storage device (e.g., thereby reducing the durability risk of the system), while at the same time balancing the amount of free space across the storage devices. Moreover, it is possible to more evenly distribute the load of incoming writes to more storage devices, with increased throughput.

Figure 7:
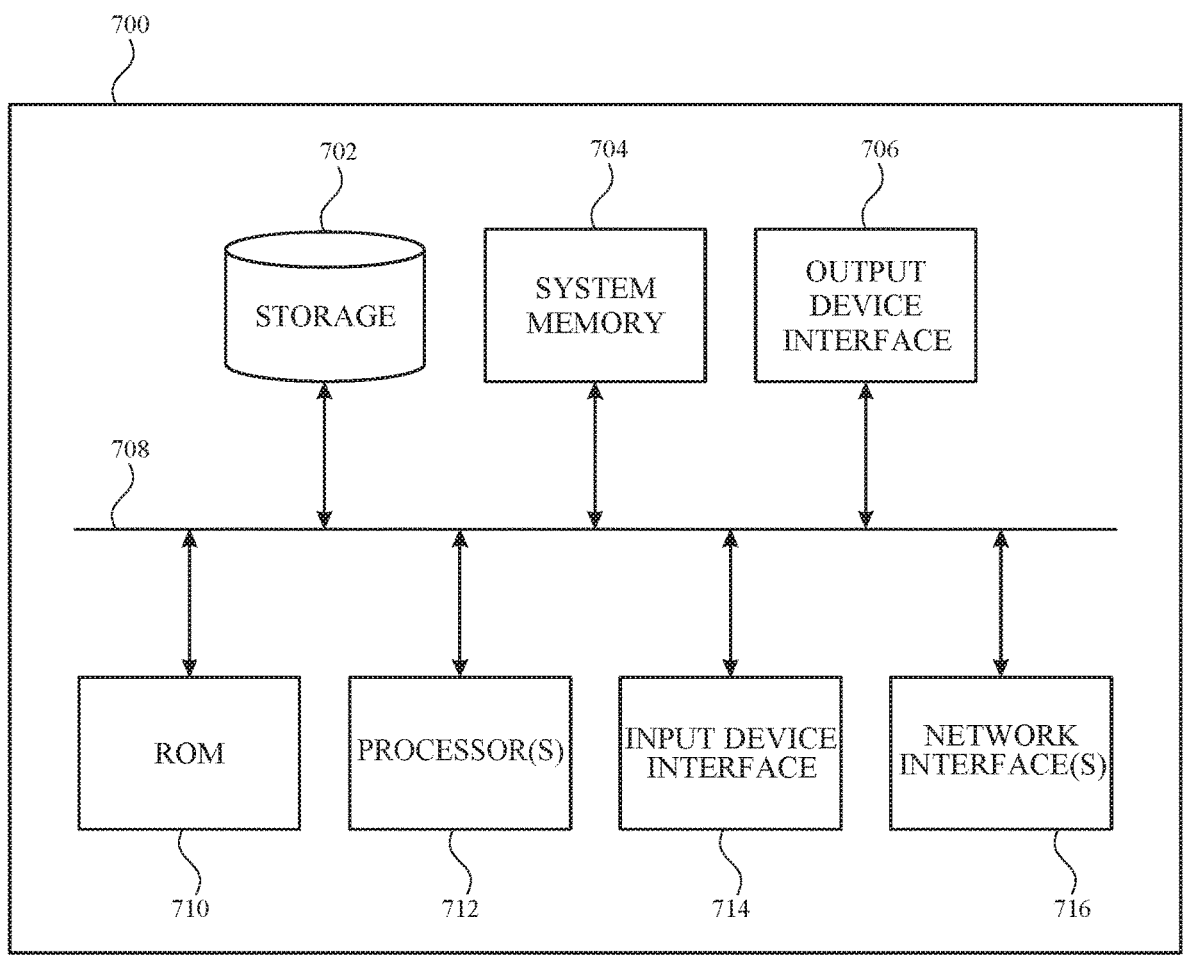
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102-104, or the storage device array 108 with controller 110. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 102 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   identifying an object stored on two of a plurality of storage devices;
   determining a pairing value for each pair of the plurality of storage devices, the pairing value corresponding to a number of stored objects common to the pair;
   selecting, based on the determined pairing values, two storage devices having a lowest pairing value relative to the determined pairing values; and
   moving the object to each of the two selected storage devices.

2. The method of claim 1, further comprising:
   detecting a failure of a first of the two selected storage devices;
   retrieving, in response to the detecting, a copy of the object from a second of the two selected storage devices; and
   storing the retrieved copy of the object on a third storage device of the plurality of storage devices.

3. The method of claim 1, the method further comprising:
   incrementing the pairing value for the two selected storage devices within a data structure that stores the pairing values.

4. The method of claim 1, wherein identifying the object comprises:
   selecting a pair of storage devices having a highest pairing value relative to the determined pairing values; and
   selecting the object as one of the stored objects common to the pair.

5. The method of claim 1, wherein each of the plurality of storage devices corresponds to at least one of a disk, an instance, a host, a rack or a data center.

6. A device, comprising:
   at least one processor; and
   a memory including instructions that, when executed by the at least one processor, cause the at least one processor to:
      identify a cluster stored across three of a plurality of storage devices, the cluster comprising first and second containers corresponding to data objects and a third container corresponding to parity data for the data objects;
      determine a pairing value for each pair of the plurality of storage devices, wherein the pairing value is based on a number of respective containers stored on the pair that belong to a respective common cluster;
      select, based on the determined pairing values, a first and second storage device of the plurality of storage devices having a lowest pairing value relative to the determined pairing values;
      select a third storage device of the plurality of storage devices, based on a summation of the pairing value for the pair of the first and third storage devices with the pairing value for the pair of the second and third storage devices; and
      move the first, second and third containers to respective ones of the first, second and third storage devices.

7. The device of claim 6, wherein the pair of the first and second storage devices further stores a lowest number of containers relative to each other pair of the plurality of storage devices.

8. The device of claim 6, wherein the third storage device is selected from the plurality of storage devices based on having a lowest summation of the pairing value for the pair of the first and third storage devices with the pairing value for the pair of the second and third storage devices.

9. The device of claim 6, wherein each of the plurality of storage devices corresponds to at least one of a disk, an instance, a host, a rack or a data center.

10. The device of claim 6, wherein the instructions further cause the at least one processor to:
   detect failure of one of the first, second or third storage devices, the detected failed storage device storing one of the first, second or third containers;
   retrieve, in response to the detection, the other two of the first, second or third containers from the respective first, second or third storage devices;
   recover the one of the first, second or third storage containers based on the retrieved other two of the first, second or third containers; and
   storing the recovered container on a fourth storage device of the plurality of storage devices.

11. The device of claim 6, wherein the instructions further cause the at least one processor to:
   increment the pairing value for the first, second and third devices within a data structure that stores the pairing values.

12. The device of claim 11, wherein the pairing value for each of the first, second and third devices is incremented by one, based on a size of the first, second and third containers being equal.

13. The device of claim 11, wherein sizes of the first, second and third containers are not equal, and wherein the pairing value for each of the first, second and third devices is incremented based on a lowest size among the first, second and third containers.

14. A computer program product comprising code stored in a non-transitory computer-readable storage medium, the code comprising:
   code to identify a cluster stored across at least three of a plurality of storage devices, the cluster comprising at least first and second containers corresponding to data objects and at least a third container corresponding to parity data for the data objects;
   code to determine a pairing value for each pair of the plurality of storage devices, wherein the pairing value is based on a number of respective containers stored on the pair that belong to a respective common cluster;
   code to select, based on the determined pairing values, at least a first and second storage device of the plurality of storage devices having a lowest pairing value relative to the determined pairing values;
   code to select at least a third storage device of the plurality of storage devices, based on a summation of the pairing value for the pair of the at least first and third storage devices with the pairing value for the pair of the at least second and third storage devices;
   code to move the at least first, second and third containers to respective ones of the at least first, second and third storage devices;
   code to detect failure of one of the at least first, second or third storage devices, the detected failed storage device storing one of the at least first, second or third containers;
   code to retrieve, in response to the detection, the other of the at least first, second or third containers from the respective at least first, second or third storage devices;
   code to recover the one of the at least first, second or third storage containers based on the retrieved other of the at least first, second or third containers; and
   code to store the recovered container on at least a fourth storage device of the plurality of storage devices.

15. The computer program product of claim 14, wherein the pair of the at least first and second storage devices further stores a lowest number of containers relative to each other pair of the plurality of storage devices.

16. The computer program product of claim 14, wherein the at least third storage device is selected from the plurality of storage devices based on having a lowest summation of the pairing value for the pair of the at least first and third storage devices with the pairing value for the pair of the at least second and third storage devices.

17. The computer program product of claim 14, wherein each of the plurality of storage devices corresponds to at least one of a disk, an instance, a host, a rack or a data center.

18. The computer program product of claim 14, the code further comprising:
   code to increment the pairing value for the at least first, second and third devices within a data structure that stores the pairing values.

19. The computer program product of claim 18, wherein the pairing value for each of the at least first, second and third devices is incremented by one, based on a size of the at least first, second and third containers being equal.

20. The computer program product of claim 18, wherein sizes of the at least first, second and third containers are not equal, and wherein the pairing value for each of the at least first, second and third devices is incremented based on a lowest size among the at least first, second and third containers.

* * * * *